US011295515B2

United States Patent
McGuire et al.

(10) Patent No.: US 11,295,515 B2
(45) Date of Patent: Apr. 5, 2022

(54) PHOTON-BASED IMAGE ILLUMINATION RENDERING

(71) Applicant: NVIDIA Corporation, Santa Clara, CA (US)

(72) Inventors: Morgan McGuire, Williamstown, MA (US); Cyril Crassin, Checy (FR); David Luebke, Charlottesville, VA (US); Michael Mara, Williamstown, MA (US); Brent L. Oster, Gilroy, CA (US); Peter Shirley, Salt Lake City, UT (US); Peter-Pike Sloan, Sammamish, WA (US); Christopher Wyman, Redmond, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/894,438

(22) Filed: Jun. 5, 2020

(65) Prior Publication Data
US 2020/0312018 A1    Oct. 1, 2020

Related U.S. Application Data

(63) Continuation of application No. 14/270,252, filed on May 5, 2014, now Pat. No. 10,713,838, which is a continuation-in-part of application No. 14/058,132, filed on Oct. 18, 2013, now Pat. No. 10,008,034.

(Continued)

(51) Int. Cl.
*G06T 15/50* (2011.01)
*G06T 15/80* (2011.01)

(52) U.S. Cl.
CPC .............. *G06T 15/80* (2013.01); *G06T 15/50* (2013.01); *G06T 15/506* (2013.01); *G09G 2360/122* (2013.01)

(58) Field of Classification Search
CPC ......... G06T 15/06; G06T 15/80; G06T 15/50; G06T 15/506; G09G 2360/122; G09G 2340/02; G09G 2360/18; G09G 5/363
See application file for complete search history.

(56) References Cited

U.S. PATENT DOCUMENTS 6,567,083 B1    5/2003  Baum et al.
7,123,259 B2 * 10/2006  Cabral ................... G06T 15/04
                                                                    345/426

(Continued)

OTHER PUBLICATIONS

Jensen (Global Illumination using Photon Maps, 1996) (Year: 1996).*

(Continued)

*Primary Examiner* — Phong X Nguyen
(74) *Attorney, Agent, or Firm* — Shook, Hardy & Bacon, L.L.P.

(57) ABSTRACT

The present invention facilitates efficient and effective image processing. A network can comprise: a first system configured to perform a first portion of lighting calculations for an image and combing results of the first portion of lighting calculations for the image with results of a second portion of lighting calculations; and a second system configured to perform the second portion of lighting calculations and forward the results of the second portion of the lighting calculations to the first system. The first and second portion of lighting calculations can be associated with indirect lighting calculations and direct lighting calculations respectively. The first system can be a client in a local location and the second system can be a server in a remote location (e.g., a cloud computing environment). The first system and second system can be in a cloud and a video is transmitted to a local system.

20 Claims, 12 Drawing Sheets

Related U.S. Application Data

(60) Provisional application No. 61/819,330, filed on May 3, 2013.

(56) References Cited

U.S. PATENT DOCUMENTS

| | | | |
|---|---|---|---|
| 7,995,059 | B1 | 8/2011 | Arvo |
| 8,147,339 | B1 | 4/2012 | Perry |
| 8,269,772 | B1* | 9/2012 | Smits .................. G06T 13/80 345/426 |
| 8,587,588 | B2* | 11/2013 | Smyth .................. G06T 15/06 345/424 |
| 2001/0037402 | A1* | 11/2001 | Schneider ............ H04L 67/306 709/236 |
| 2005/0041024 | A1* | 2/2005 | Green .................. G06T 15/50 345/426 |
| 2006/0066616 | A1 | 3/2006 | Sevastianov et al. |
| 2007/0139433 | A1* | 6/2007 | Anderson ............. G06T 15/50 345/582 |
| 2007/0229502 | A1* | 10/2007 | Tong .................. G06T 15/55 345/426 |
| 2008/0018647 | A1* | 1/2008 | Bunnell ............... G06T 13/00 345/426 |
| 2008/0143720 | A1* | 6/2008 | Elmquist .............. G06T 15/50 345/426 |
| 2008/0207322 | A1 | 8/2008 | Mizrahi |
| 2009/0167763 | A1* | 7/2009 | Waechter ............. G06T 17/005 345/426 |
| 2009/0254293 | A1* | 10/2009 | Tartaglia ............. G06T 15/50 702/85 |
| 2010/0033493 | A1 | 2/2010 | Nutter et al. |
| 2010/0315423 | A1* | 12/2010 | Ahn .................. G06T 15/50 345/426 |
| 2011/0012901 | A1* | 1/2011 | Kaplanyan ............ G06T 15/55 345/426 |
| 2011/0043523 | A1* | 2/2011 | Kim .................. G06T 15/506 345/426 |
| 2011/0122135 | A1* | 5/2011 | Kim .................. G06T 1/20 345/426 |
| 2011/0175913 | A1* | 7/2011 | Sloan ................. G06T 15/04 345/426 |
| 2012/0212491 | A1 | 8/2012 | Hager |
| 2012/0256915 | A1 | 10/2012 | Jenkins |
| 2012/0313944 | A1 | 12/2012 | Kontkanen et al. |
| 2013/0038618 | A1* | 2/2013 | Urbach ................ G06T 15/06 345/522 |
| 2013/0113800 | A1 | 5/2013 | McCombe et al. |
| 2013/0120385 | A1* | 5/2013 | Krishnaswamy ....... G06T 15/50 345/426 |
| 2013/0137511 | A1 | 5/2013 | Bae et al. |
| 2013/0321417 | A1* | 12/2013 | Van Den Berghe .......... H04N 19/593 345/420 |
| 2013/0335434 | A1* | 12/2013 | Wang .................. G06N 20/20 345/581 |
| 2014/0035900 | A1* | 2/2014 | Slavin, III ........... G06T 15/20 345/419 |
| 2014/0139513 | A1* | 5/2014 | Mammou .............. G06T 1/20 345/419 |
| 2014/0173674 | A1 | 6/2014 | Wolman et al. |
| 2014/0232719 | A1* | 8/2014 | Wahrenberg ........... G06T 15/08 345/424 |
| 2014/0267271 | A1* | 9/2014 | Billeter .............. G06T 15/005 345/426 |
| 2014/0285499 | A1* | 9/2014 | Iwasaki ............... G06T 11/60 345/502 |
| 2015/0325035 | A1* | 11/2015 | Howell ................ G06T 15/50 345/426 |

OTHER PUBLICATIONS

McGuire et al. (Hardware-Accelerated Global Illumination by Image Space Photon Mapping, 2009) (Year: 2009).*

Airieau et al. (Photon streaming for interactive global illumination in dynamic scenes, 2011) (Year: 2011).*

Elek et al. (Real-Time Screen-Space Scattering in Homogeneous Environments, 2013) (Year: 2013).*

Wyman et al. "Interactive Display of Isosurfaces with Global Illumination", 2004 IEEE Transactions on Visualization and Computer Graphics, vol. 12, Issue: 2, pp. 1-9.

Kionsky, "A New Architecture for Cloud Rendering and Amortized Graphics", 2011, School of Computer Science, Computer Science Department, Carnegie Mellon University, pp. 1-39.

Waters, "Photon Mapping", 2006, https://web.cs.wpi.edu/~emmanuel/courses/cs563/write_ups/zackw/?photon_mapping/PhotonMapping.html, pp. 1-8.

Ramamoorthi, "An Efficient Representation for Irradiance Environment Maps", 2001, SIGGRAPH '01 Proceedings of the 28th annual conference on Computer graphics and interactive techniques, pp. 497-500.

Pacanowski et al. "Efficient Streaming of 3D Scenes with Complex Geometry and Complex Lighting", 2008, Web3D '08 Proceedings of the 13th international symposium on 3D web technology, pp. 11-17.

Meneveaux et al. "Photon Streaming for interactive Global Illumination in Dynamic Scenes", 2008, https://hal.archives-puvertes.fr/hal-00331236, pp. 1-16.

Non-Final Office Action from U.S. Appl. No. 14/270,252, dated Sep. 24, 2015.

Pacanowski, R. et al. "Efficient Streaming of 3D Scenes with Complex Geometry and Complex Lighting," 2008, pp. 1-7.

Christensen, P.H. et al., "An Irradiance Atlas for Global Illumination in Complex Production Scenes," Eurographics Symposium on Rendering, 2004, pp. 1-10.

Loos, B. J., & Sloan, P. P. (Feb. 2010). Volumetric obscurance. In Proceedings of the 2010 ACM SIGGRAPH symposium on Interactive 3D Graphics and Games (pp. 151-156).

McGuire, M. (Feb. 2010). Ambient occlusion volumes. Proceedings of the Conference on high Performance Graphics, Eurographics Association, Jun. 2010, pp. 47-56.

McGuire, M., Osman, B., Bukowski, M., & Hennessy, P. (Aug. 2011). The alchemy screen-space ambient obscurance algorithm. In Proceedings of the ACM SIGGRAPH Symposium on High Performance Graphics (pp. 25-32).

McTaggart, G. "Half-Life 2 / Valve Source Shading," Direct3D Tutorial Day, Game Developers Conference, Valve Corporation, Mar. 22, 2004, 97 slides, retrieved from URL <http://www.valvesoftware.com/publications/2004-GDC2004_Halfe-Life2_Shading.pdf>.

Miller, G. S., & Hoffman, C. D. (1984). Illumination and reflection maps. Course Notes for Advanced Computer Graphics Animation, SIGGRAPH 84.

Mittring, M. (2007). Finding next gen: Cryengine 2. In ACM SIGGRAPH 2007 courses (pp. 97-121).

McGuire, M., Mara, M., & Luebke, D. P. (Jun. 2012). Scalable Ambient Obscurance. In High Performance Graphics (pp. 97-103).

Nicodemus, F. E., Richmond, J. C., Hsia, J. J., Ginsberg, I. W., & Limperis, T. (1977). Geometrical considerations and nomenclature for reflectance (vol. 160). Washington, DC: US Department of Commerce, National Bureau of Standards.

Noguera, J. M., Segura, R. J., Ogayar, C. J., & Joan-Arinyo, R. (2011). Navigating large terrains using commodity mobile devices. Computers & geosciences, 37(9), 1218-1233.

"Gpu gems 2: programming techniques for high-performance graphics and general-purpose computation (Gpu Gems)," Addison-Wesley Professional, Apr. 2005, can be retrieved at http://http.developer.nvidia.com/GPUGems2/gpugems2_part01.html.

Ramamoorthi, R., & Hanrahan, P. (Aug. 2001). An efficient representation for irradiance environment maps. In Proceedings of the 28th annual conference on Computer graphics and interactive techniques (pp. 497-500).

Rose, M., "OnLive works with game devs on newly-launched tablet, smartphone initiative," Dec. 8, 2011, p. 1, retrieved at <http://www.gamasutra.com/view/news/128588/OnLive_Works_With_Game_Devs_On_NewlyLaunched_Tablet_Smartphone_Initiative.php>.

(56) References Cited

OTHER PUBLICATIONS

Shanmugam, P., & Arikan, O. (Apr. 2007). Hardware accelerated ambient occlusion techniques on GPUs. In Proceedings of the 2007 symposium on Interactive 3D graphics and games (pp. 73-80).

Sloan, P. P. (Feb. 2008). Stupid spherical harmonics (sh) tricks. In Game developers conference (vol. 9, p. 42).

Smith, A. R. (1983). The viewing transformation. Computer Graphics Project, Computer Division, Lucasfilm, Ltd. Technical Memo, (84).

Szirmay-Kalos, L., Umenhoffer, T., Tóth, B., Szécsi, L., & Sbert, M. (2010). Volumetric ambient occlusion for real-time rendering and games. IEEE Computer Graphics and Applications, 30(1), 70-79.

Scheuermann, T., & Isidoro, J. "Cubemap filtering with cubemapgen." ATI: 3D Application Research Group, Game Developer Conference 2005, 27 slides.

Upchurch, P., & Desbrun, M. (2012). Tightening the precision of perspective rendering. Journal of Graphics Tools, 16 (1), 40-56.

Veach, E., & Guibas, L. J. (Aug. 1997). Metropolis light transport. In Proceedings of the 24th annual conference on Computer graphics and interactive techniques (pp. 65-76).

Williams, L. (Aug. 1978). Casting curved shadows on curved surfaces. In Proceedings of the 5th annual conference on Computer graphics and interactive techniques (pp. 270-274).

Foley, J. D. (1976). A tutorial on satellite graphics systems. Computer, 9(8), 14-21.

Armbrust, M., et al. (2010). A view of cloud computing. Communications of the ACM, 53(4), 50-58.

Boukerche, A., & Pazzi, R. W. N. (Oct. 2006). Remote rendering and streaming of progressive panoramas for mobile devices. In Proceedings of the 14th ACM international conference on Multimedia (pp. 691-694).

Boulton, M. (2013). Static lighting tricks in Halo 4. GDC Presentation, 2013, 17 slides.

Brodlie, K. W., Duce, D. A., Gallop, J. R., Walton, J. P., & Wood, J. D. (Jun. 2004). Distributed and collaborative visualization. In Computer graphics forum (vol. 23, No. 2, pp. 223-251). 9600 Garsington Road, Oxford, OX4 2DQ, UK.: Blackwell Publishing Ltd.

Chalmers, A. et al. Practical parallel rendering. A K Peters, 2002, pp. v-xiii and 3-370.

Chang, L., Frank, D. J., Montoye, R. K., Koester, S. J., Ji, B. L., Coteus, P. W., . . . & Haensch, W. (2010). Practical strategies for power-efficient computing technologies. Proceedings of the IEEE, 98(2), 215-236.

Chen, K. T., Chang, Y. C., Tseng, P. H., Huang, C. Y., & Lei, C. L. (Nov. 2011). Measuring the latency of cloud gaming systems. In Proceedings of the 19th ACM international conference on Multimedia (pp. 1269-1272).

Choy, S., Wong, B., Simon, G., & Rosenberg, C. (Nov. 2012). The brewing storm in cloud gaming: A measurement study on cloud to end-user latency. In 2012 11th Annual Workshop on Network and Systems Support for Games (NetGames) (pp. 1-6). IEEE.

Cohen, M. F., Chen, S. E., Wallace, J. R., & Greenberg, D. P. (Jun. 1988). A progressive refinement approach to fast radiosity image generation. In Proceedings of the 15th annual conference on Computer graphics and interactive techniques (pp. 75-84).

Crassin, C., Neyret, F., Sainz, M., Green, S., & Eisemann, E. (Sep. 2011). Interactive indirect illumination using voxel cone tracing. In Computer Graphics Forum (vol. 30, No. 7, pp. 1921-1930) Oxford, UK: Blackwell Publishing Ltd.

Crassin, C., Luebke, D., Mara, M., McGuire, M., Oster, B., Shirley, P., & Wyman, P. P. S. C. (2015). Cloudlight: A system for amortizing indirect lighting in real-time rendering. Journal of Computer Graphics Techniques vol. 4(4), 1-27.

Dutre, P., "Advanced global illumination," SIGGRAPH 2002 Course 2 (Half Day), 2002, pp. 1-225.

Hu, H. H., Gooch, A. A., Thompson, W. B., Smits, B. E., Rieser, J. J., & Shirley, P. (Oct. 2000). Visual cues for imminent object contact in realistic virtual environments. In Proceedings Visualization 2000. VIS 2000 (Cat. No. 00CH37145) (pp. 179-185). IEEE.

Jensen, H. W. (2001). Realistic image synthesis using photon mapping. AK Peters/CRC Press, pp. 1-181.

Karapantazis, S., & Pavlidou, F. N. (2009). VoIP: A comprehensive survey on a promising technology. Computer Networks, 53(12), 2050-2090.

Koller, D., Turitzin, M., Levoy, M., Tarini, M., Croccia, G., Cignoni, P., & Scopigno, R. (2004). Protected interactive 3D graphics via remote rendering. ACM Transactions on Graphics (TOG), 23(3), 695-703.

Lawton, G. (2012). Cloud streaming brings video to mobile devices. Computer, 45(2), 14-16.

Loos, B. J., et al., "Modular radiance transfer," ACM Transactions on Graphics (TOG), Proceedings of ACM SIGGRAPH Asia 2011, vol. 30, No. 6, Dec. 2011, Article No. 178, pp. 1-10.

Luke, E. J., & Hansen, C. D. (2002). Semotus visum: a flexible remote visualization framework (pp. 61-68). IEEE.

Manzano, M., Hernandez, J. A., Uruena, M., & Calle, E. (Nov. 2012). An empirical study of cloud gaming. In 2012 11th Annual Workshop on Network and Systems Support for Games (NetGames) (pp. 1-2). IEEE.

Mara, M. "CloudLight: A distributed global illumination system for real-time rendering," Thesis, May 13, 2012, pp. 1-62.

Martin, S., Geomerics, Electronic Arts (EA) DICE, "A real-time radiosity architecture for video games," SIGGRAPH 2010 courses, Slideshow, Aug. 1, 2010, 37 slides.

Mitchell, J., et al., "Shading in valve's source engine," Advance Real-Time Rendering in 3D Graphics and Games COurse—ACM SIGGRAPH 2006, Chapter 8, pp. 8-1-8-14.

Parker, S. G., et al.,"OptiX: a general purpose ray tracing engine," Acm transactions on graphics vol. 29, No. 4, Article No. 66, Jul. 2010, 66:1-66:13.

Paul, B., et al. (2008). Chromium renderserver: Scalable and open remote rendering infrastructure. IEEE Transactions on Visualization and Computer Graphics, 14(3), 627-639.

Ritschel, T., et al. "The state of the art in interactive global illumination," In Computer Graphics Forum, Blackwell Publishing Ltd., vol. 0, No. 0, 1981, pp. 1-27.

Rao, A., Legout, A., Lim, Y. S., Towsley, D., Barakat, C., & Dabbous, W. (Dec. 2011). Network characteristics of video streaming traffic. In Proceedings of the Seventh COnference on emerging Networking EXperiments and Technologies (pp. 1-12).

Shi, S., Nahrstedt, K., & Campbell, R. (2012). A real-time remote rendering system for interactive mobile graphics. ACM Transactions on Multimedia Computing, Communications, and Applications (TOMM), 8(3s), 1-20.

Sinha, P., & Adelson, E. (May 1993). Recovering reflectance and illumination in a world of painted polyhedra. In 1993 (4th) International Conference on Computer Vision (pp. 156-163). IEEE.

Suznjevic, M., Dobrijevic, O., & Matijasevic, M. (2009). MMORPG player actions: Network performance, session patterns and latency requirements analysis Multimedia tools and applications, 45(1-3), 191-214.

Tamm, G., Fogal, T., & Kruger, J. (2012). Hybrid distributed rendering. In Poster at IEEE LDAV Symposium (vol. 5).

Whitted, T. "An improved illumination model for shaded display," ACM SIGGRAPH Computer Graphics, vol. 13, Issue 2, Aug. 1979, pp. 1-6.

Akeley, K., & Su, J. (Sep. 2006). Minimum triangle separation for correct z-buffer occlusion. In Graphics Hardware (vol. 10, p. 1283900-1283904).

Akenine-Möller, T., Haines, E., & Hoffman, N. "Real-time rendering." 3rd edition, A.K. Peters, Ltd., 2008, pp. 1-1027.

Arikan, O., Forsyth, D. A., & O'Brien, J. F. (2005). Fast and detailed approximate global illumination by irradiance decomposition. In ACM SIGGRAPH 2005 Papers (pp. 1108-1114).

Bavoil, L., & Sainz, M. (2009). Multi-layer dual-resolution screen-space ambient occlusion. In SIGGRAPH 2009: Talks (pp. 1-1).

Blinn, J. F., & Newell, M. E. (1976). Texture and reflection in computer generated images. Communications of the ACM, 19(10), 542-547.

Filion, D., & McNaughton, R. (2008). Effects & techniques. In ACM SIGGRAPH 2008 Games (pp. 133-164).

(56) References Cited

OTHER PUBLICATIONS

Green, C. (2007). Efficient self-shadowed radiosity normal mapping. In ACM SIGGRAPH 2007 courses (pp. 1-8).
Greene, N. (1986). Environment mapping and other applications of world projections. IEEE Computer Graphics and Applications, 6(11), 21-29.
Hoang, T. D., & Low, K. L. (2012). Efficient screen-space approach to high-quality multiscale ambient occlusion. The Visual Computer, 28(3), 289-304.
Immel, D. S., Cohen, M. F., & Greenberg, D. P. (1986). A radiosity method for non-diffuse environments. Acm Siggraph Computer Graphics, 20(4), 133-142.
Jensen, H. W. (Jun. 1996). Global illumination using photon maps. In Eurographics workshop on Rendering techniques (pp. 21-30). Springer, Vienna.
Kajiya, J. T. (Aug. 1986). The rendering equation. In Proceedings of the 13th annual conference on Computer graphics and interactive techniques (pp. 143-150).
Kaplanyan, A. (2010). CryENGINE 3: Reaching the speed of light. SIGGRAPH 2010 courses. 99 slides.
King, G., "Real-Time Computation of Dynamic Irradiance Environment Maps," GPU Gems 2, Apr. 2005, pp. 1-14, retrieved from <http:developer.nvidia.com/GPUGems2/gpugems2_chapter10.html>.
Lafortune, E. (1996). Mathematical models and Monte Carlo algorithms for physically based rendering. Department of Computer Science, Faculty of Engineering, Katholieke Universiteit Leuven, 20, 74-79.
Lapidous, E., & Jiao, G. (Jul. 1999). Optimal depth buffer for low-cost graphics hardware. In Proceedings of the ACM SIGGRAPH/EUROGRAPHICS workshop on Graphics hardware (pp. 67-73).
Levoy, M. (Sep. 1995). Polygon-assisted JPEG and MPEG compression of synthetic images. In Proceedings of the 22nd annual conference on Computer graphics and interactive techniques (pp. 21-28).
Damez, C., Dmitriev, K., & Myszkowski, K. (Mar. 2003). State of the art in global illumination for interactive applications and high-quality animations. In Computer graphics forum (vol. 22, No. 1, pp. 55-77). Oxford, UK: Blackwell Publishing, Inc.
Xu, R., Pattanaik, S. N., & Hughes, C. E. (2004). Real-time Rendering of Dynamic Objects in Dynamic, Low-frequency Lighting Environments. Proc. of Computer Animation and Social Agents04.
Mara, M., et al., "Toward Practical Real-Time Photon Mapping: Efficient GPU Density Estimation", Proceedings of the ACM SIGGRAPH Symposium on Interactive 3D Graphics and Games, ACM, pp. 1-9 (Mar. 2013).
Waggoner, C., et al., "Combining Dynamic Simulation, High Dynamic Range Photography and Global Illumination", pp. 1-12 (1998).

\* cited by examiner (Conventional Approach)

(Conventional Approach)

800

810

Performing a first portion of lighting calculations for an image at a local location.

820

Performing a second portion of lighting calculations for an image at a remote location.

830

Communicating results from the second portion of the lighting calculations to the first system at the local location.

840

Combining the first portion of the lighting calculations with the second portion of the lighting calculations, wherein the combining is performed on the first system at the local location.

FIG 8

PHOTON-BASED IMAGE ILLUMINATION RENDERING

RELATED APPLICATIONS

This application claims the benefit of and priority to provisional application 61/819,330 entitled "Computing Indirect Lighting in the Cloud for Interactive Display on a Client" filed May 3, 2013, and this application is a continuation-in-part to U.S. patent application Ser. No. 14/058,132, entitled "System, Method, and Computing Program Product for Computing Indirect Lighting in a Cloud Network filed Oct. 18, 2013. This application is a continuation of U.S. patent application Ser. No. 14/270,252, titled "IMAGE ILLUMINATION RENDERING SYSTEM AND METHOD," filed May 5, 2014. Each of these applications is incorporated herein by reference in its entirety.

FIELD OF THE INVENTION

The present invention relates to the field of image presentation. In one embodiment, indirect lighting is computed in the cloud and amortized in real-time rendering.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Frequently, these activities involve rendering and displaying images. However, rendering can involve complicated processing that occupies valuable resources and consumes time.

As user interfaces shift between a variety of platforms, (e.g., mobile phones, tablets, etc.) a number of applications (e.g., video, advanced games, graphics, etc.) face new challenges. Many popular traditional devices lack computational horsepower to render advanced effects such as global illumination, yet users typically expect continually increasing graphics quality. However, different platforms (e.g., laptops, tablets, cell phones, other mobile devices, etc.) usually have a number of limitations, (e.g., power limited, thermal limited, etc.). Many platforms are unlikely to reach desired rendering performance by relying only on Moore's Law alone. Some traditional Cloud graphics approaches attempt to offer a solution, replacing local client rendering with remote rendering. Some traditional systems attempt to offer advantages beyond improved image quality (e.g., virtualization; lower costs and piracy protection) and have started appearing commercially.

While design of rendering pipelines for PCs and consoles is reasonably well understood, design of Cloud pipelines is in its infancy. Prior cloud attempts, including commercial systems, typically use a very simple offload approach: which include synchronously map rendering for each user's frame to a single server. Remote offline-rendering systems like Autodesk360 may also attempt to do this, but the latency is irrelevant and not usually practically applicable to real-time focused applications. Conventional full-frame remote rendering attempts are often limited to simply running them within a virtual computing environment and streaming their output as video. FIG. 1 is a block diagram of a conventional approach in which all the indirect and direct light calculations are performed on a cloud. Some conventional cloud gaming approaches perform all the indirect and direct light calculations on a local client. FIG. 2 is a block diagram of a conventional approach in which all the indirect and direct light calculations are performed on a local client. Either way, the legacy attempts also typically have minimal or no amortization and scalability capability, often both critical requirements for economic Cloud deployments. In addition, traditional approaches also usually couple local device rendering latency to delays in network latency.

SUMMARY

The present invention facilitates efficient and effective image processing. In one embodiment, a network comprises: a first system configured to perform a first portion of lighting calculations for an image and combing results of the first portion of lighting calculations for the image with results of a second portion of lighting calculations; and a second system configured to perform the second portion of lighting calculations and forward the results of the second portion of the lighting calculations to the first system. The second portion of lighting calculations can be associated with indirect lighting calculations and the first portion of lighting calculations can be associated with direct lighting calculations. The first system can be in a local location and the second system can be in a remote location. For example, the first system can be a client and the second system can be a server. The second system can be in a cloud computing environment. It is also appreciated the first system and the second system can be in a cloud computing environment and a video including the image is transmitted to a local system.

In one exemplary implementation, the results of the second portion of the lighting calculations (e.g., indirect lighting results, etc.) can be amortized over a plurality of systems. For example, the results of the second portion of lighting calculations are transmitted to a third or more systems and combined with a plurality of results of other portions of lighting calculations performed by the third or more systems. It is also appreciated the lighting calculations can be implemented in a variety of approaches. The results of the second portion of lighting calculations include Voxel results and the Voxel results are combined with the first lighting calculation results on the first system. The results of the second portion of lighting calculations include irradiance map results and the irradiance map results are combined with the first lighting calculation results on the first system. The results of the second portion of lighting calculations include photon results and the photon results are combined with the first lighting calculations results on the first system.

DESCRIPTION OF THE DRAWINGS

The accompanying drawings, which are incorporated in and form a part of this specification, are included for exemplary illustration of the principles of the present invention and not intended to limit the present invention to the particular implementations illustrated therein. The drawings are not to scale unless otherwise specifically indicated.

FIG. 8 is a flow chart of an exemplary method in accordance with one embodiment of the present invention.

DETAILED DESCRIPTION

Figure 1:
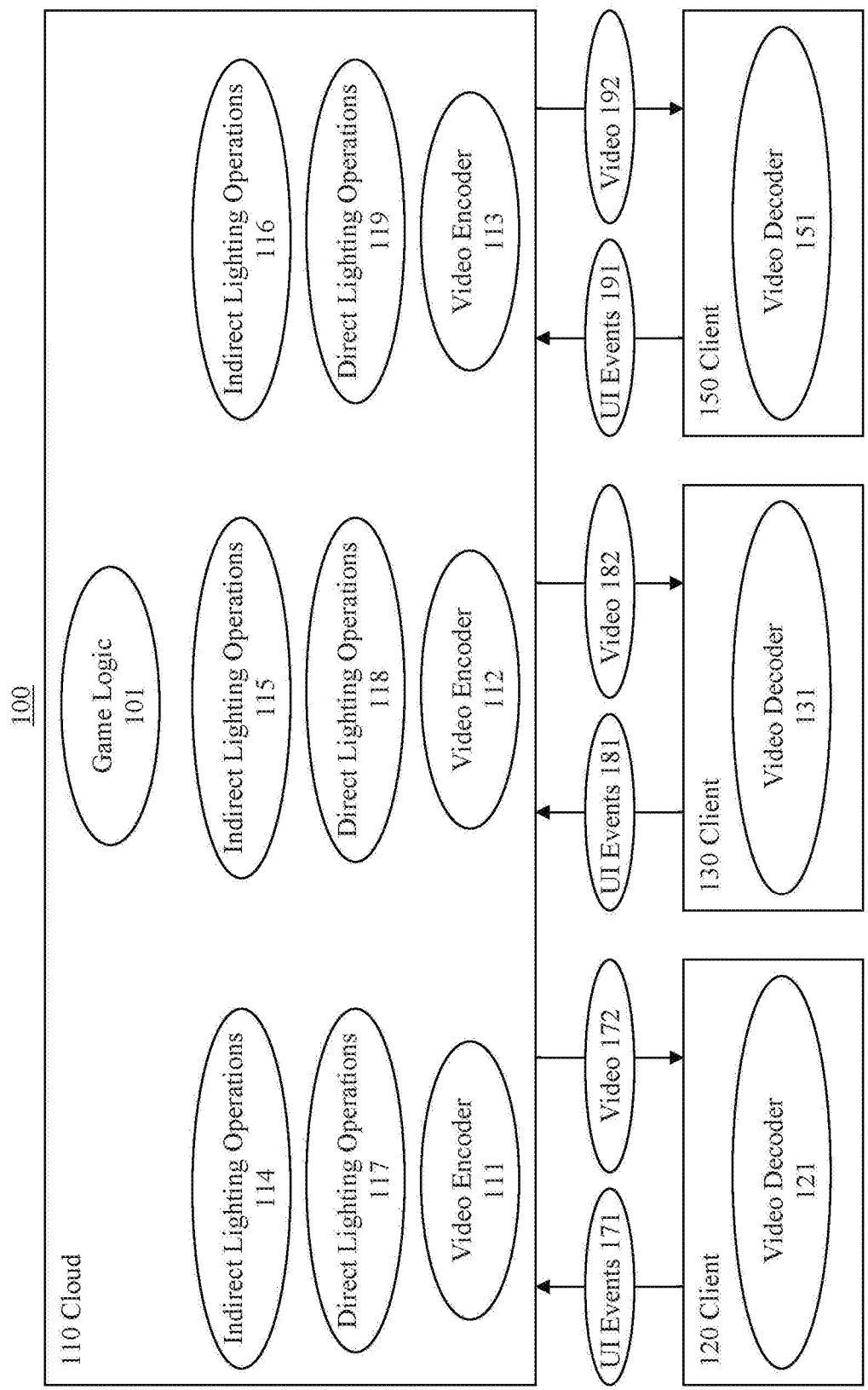
FIG. 1 is a block diagram of a conventional approach in which all the indirect and direct light calculations are performed on a remote server.
Figure 2:
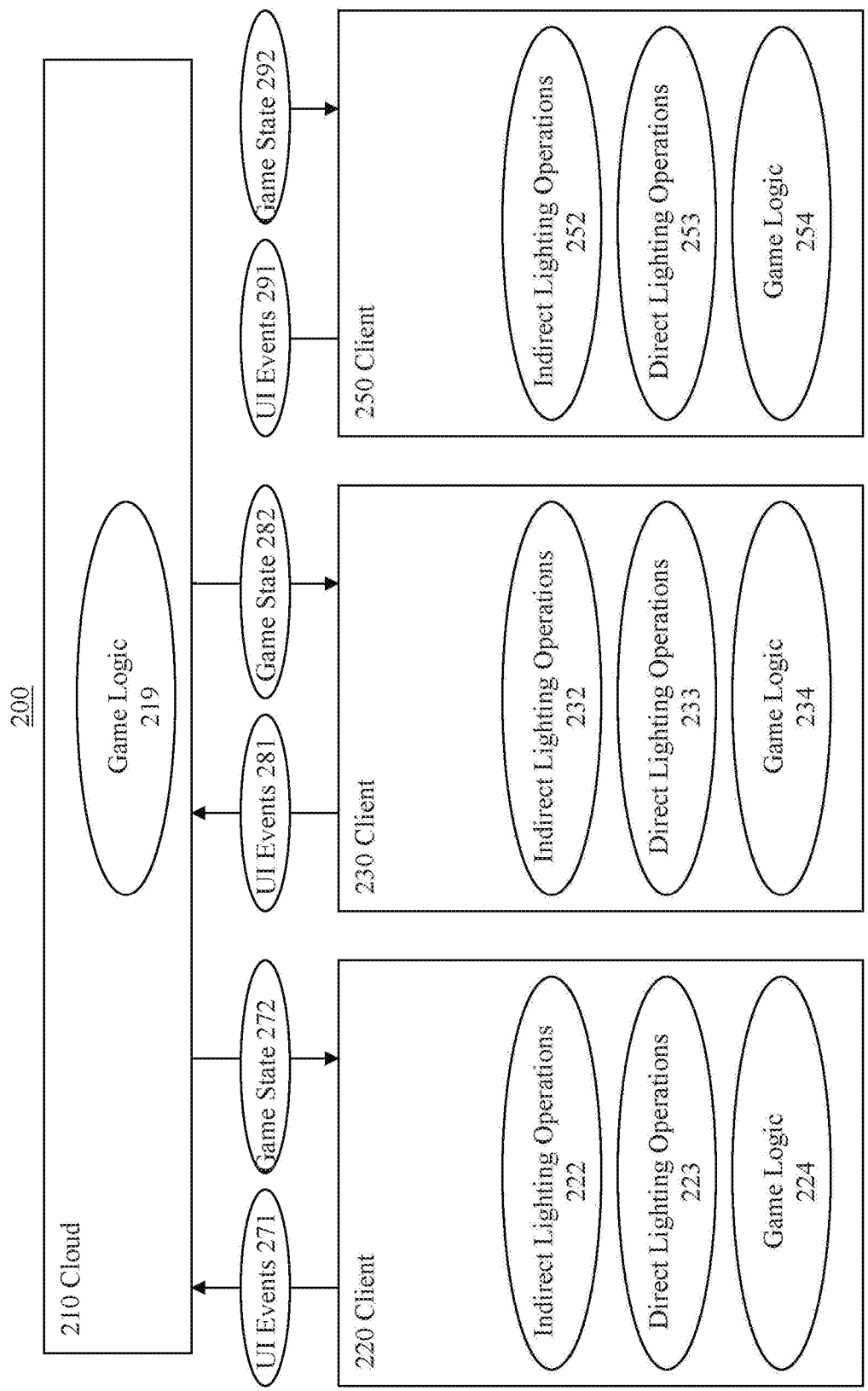
FIG. 2 is a block diagram of a conventional approach in which all the indirect and direct light calculations are performed on a local client.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The present invention facilitates effective and efficient image processing. In one embodiment, portions of lighting calculations are split between different systems. In one exemplary implementation, indirect lighting calculations are performed on a remote system or device (e.g., in a server, in the cloud, etc.) and communicated to a local system or device (e.g., client, end user mobile device, etc.) which combines the indirect lighting results with results of direct lighting calculations that are performed on the local system. A first system can achieve greater end use display functionality and results by offloading portions of the lighting calculations to a second system. For example, a mobile device with relatively limited processing capability can provide better image presentations than would otherwise be available to just the mobile device alone. In addition, present approaches can facilitate conservation of resources by amortizing indirect lighting calculation results over a variety of different systems.

Indirect lighting rendering typically involves consumption of significantly more processing resources than direct lighting rendering. The computation of indirect light is often too expensive for weaker or smaller clients (e.g., phones, tablets, PCs with lesser performance capabilities, etc.). Present approaches in which indirect lighting calculations are performed on a stronger or larger server and the results are forwarded to the client for to be composed with direct light on the client enables richer graphics capabilities and presentations on the otherwise weaker or lower performance clients.

A variety of lighting strategies can be implemented (e.g., offline and near-real time illumination path approaches, light map approaches, photon map approaches, cone/beam tracing approaches, voxelized transport approaches, etc.). In one embodiment, direct lighting and indirect lighting are not synchronized and indirect lighting associated algorithms and calculations can be run asynchronously in the cloud. For example, indirect lighting from a car might lag behind the direct lighting (which includes the shadow). It is not necessarily intuitive that this asynchrony is visually acceptable, but numerous present implementation tests confirm that it is generally visually acceptable for relatively large time gaps (e.g., ½ second, etc.) between direct and indirect lighting. In one exemplary implementation, a present approach is extremely beneficial for cloud gaming where hard to control lag is a key practical issue.

A system implementing present approaches may be configured to include many useful features and characteristics. For example, the system can be configured to compute shared indirect lighting in the cloud using a shared GPU rather than a GPU or virtual GPU per client. A number of streaming approaches can be implemented to improve latency. The system can be configured to: stream batches of photons to reduce latency and improve efficiency of photon processing; stream voxel blocks to reduce latency; stream [irradiance] light maps encoded as H.264 video; and use H.264 video to compress non-visual data. The system can be configured to predict future lighting conditions by dead reckoning and physical movement simulation to reduce latency, so the client can predict where the lighting changes will be. Many-to-many sharing of lighting servers and direct illumination clients can be implemented. Fading transitions between streamed indirect lighting data updates can also be implemented.

Figure 3:
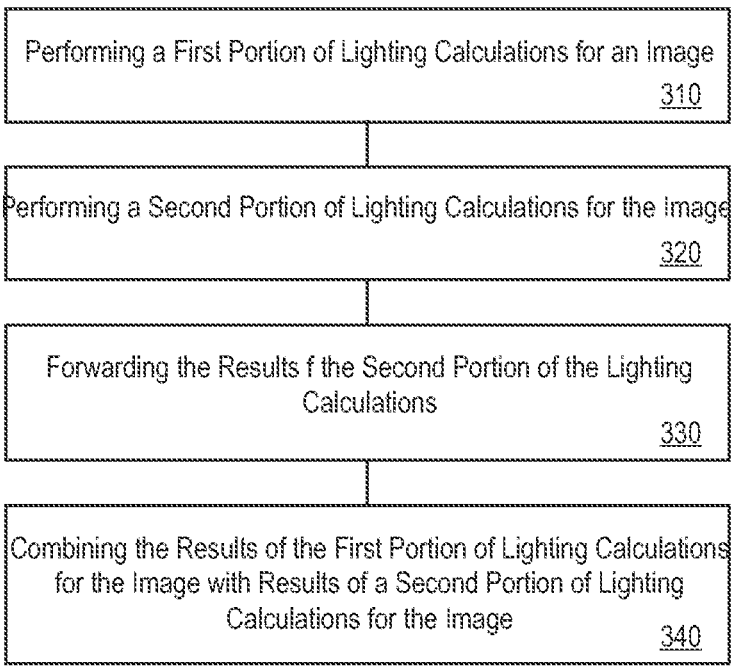
FIG. 3 is a flow chart of an exemplary method in accordance with one embodiment of the present invention.

FIG. 3 is a flow chart of an exemplary method 300 in accordance with one embodiment of the present invention. In one embodiment, a first system is configured to perform operations associated with blocks 310 and 340 and a second system is configured to perform operations associated with blocks 320 and 330.

In block 310, a first portion of lighting calculations for an image is performed. In one embodiment, the first portion of lighting calculations is associated with direct lighting calculations for the image.

In block 320, a second portion of lighting calculations for an image is performed. In one embodiment, the second portion of the lighting calculations is associated with indirect lighting calculations for the image.

In block 330, the results of the second portion of the lighting calculations are forwarded to another system. In one embodiment, the results of the second portion of the lighting calculations are forwarded from the second system to the first system. In one exemplary implementation, the results of the second portion of the lighting calculations are forwarded from the second system to a plurality of systems.

In block 340, results of the first portion of lighting calculations for the image are combined with results of the second portion of lighting calculations. In one embodiment, the image is rendered and displayed based upon the combination of the results of the first portion of lighting calculations and the results of the second portion of lighting calculations.

It is appreciated that a first portion and second of lighting calculations can be directed to a variety of lighting aspects and the indication of direct lighting and indirect light is just one of many. In one embodiment, direct lighting is considered to be light that comes directly from a light source to a viewed point or surface (which can also produce familiar shadows when the light is blocked). In one embodiment, indirect light (also sometimes referred to as bounce light) is light that bounces off or is reflected off another surface and illuminates the point or surface being viewed. For example, reflected light on the bottom of a person's chin when the sun is above can be considered indirect light.

It is appreciated that method 300 is compatible with a variety of illumination algorithms or calculation approaches (e.g., voxel, irradiance maps, photon, etc.). In one embodiment, the results of the second portion of lighting calculations include Voxel results and the Voxel results are combined with the first portion of lighting calculation results on the first system. Voxel based indirect lighting computation can involve storing indirect light values corresponding to a 3D volume as voxels (e.g., a 3D lattice, etc.). The second portion of lighting calculations results include irradiance map results and the irradiance map results are combined with the first portion of lighting calculation results on the first system. Algorithms can be applicable to light maps where the indirect light values are stored as textures (e.g., images, etc.). In one exemplary implementation, the results of the second portion of lighting calculations include photon results and the photon results are combined with the first lighting calculations results on the first system. Photon approaches can involve storing the indirect light as 3D points. Additional description of various illumination algorithms or calculation approaches is included in subsequent sections of the detailed description.

It is appreciated that method 300 can be implemented in a variety of environments and network configurations. In one embodiment, the first system is in a local location and the second system is in a remote location. The first system can be a client and the second system can be server. All or some of the systems can be included in a cloud computing environment or architecture. It is also appreciated that network configurations can include additional systems. In one embodiment, the results of the second portion of lighting calculations are forwarded to a third or more systems and combined with a plurality of results of other portions of lighting calculations performed by the third or more systems. Present approaches are readily scalable for implementation with numerous devices (e.g., 10 end-user devices, 50 end user devices, 100 end user devices, 5 servers, 2 physical servers configured as one virtual server, etc.).

Figure 4:
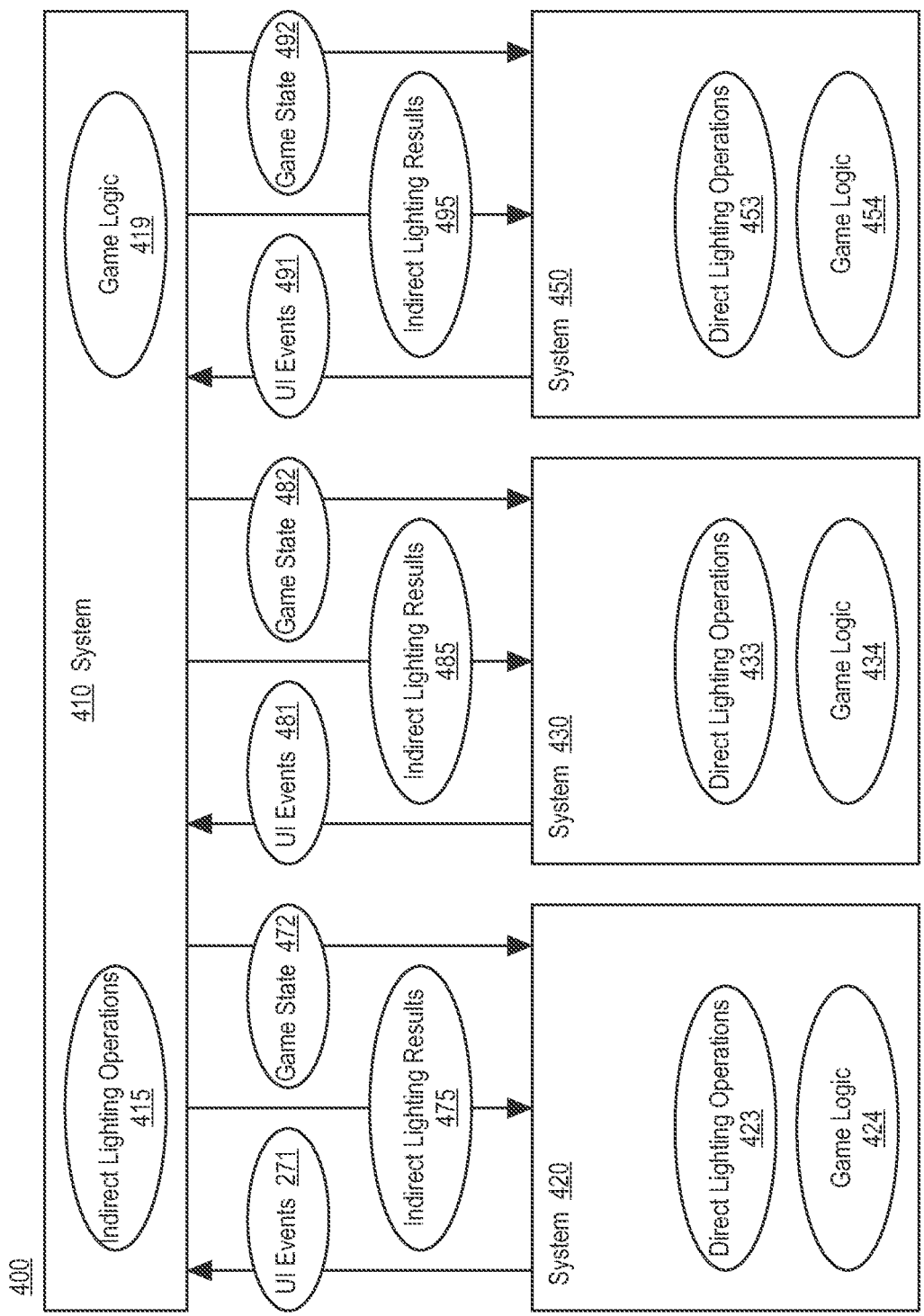
FIG. 4 is a block diagram of exemplary architecture in which direct lighting and indirect lighting calculations are performed on different systems in accordance with one embodiment of the present invention.

FIG. 4 is a block diagram of exemplary architecture 400 in accordance with one embodiment of the present invention. Architecture 400 includes system 410, system 420, system 430, and system 450. System 410 performs indirect lighting operations 415 and game logic operations 419. Indirect lighting result information 475, 485 and 495 is forwarded to systems 420, 430 and 450 respectively. System 420 performs direct lighting operations 423 and game logic operations 424. System 430 performs direct lighting operations 433 and game logic operations 434. System 450 performs direct lighting operations 453 and game logic operations 454. Systems 420, 430 and 450 forward User Interface (UI) event information 471, 481 and 491 respectively to system 410. System 410 forwards game state information 472, 482, and 492 to systems 420, 430, and 450 respectively. Systems 420, 430 and 450 combine the indirect lighting operations results with the direct lighting operation results during image rendering.

Figure 5:
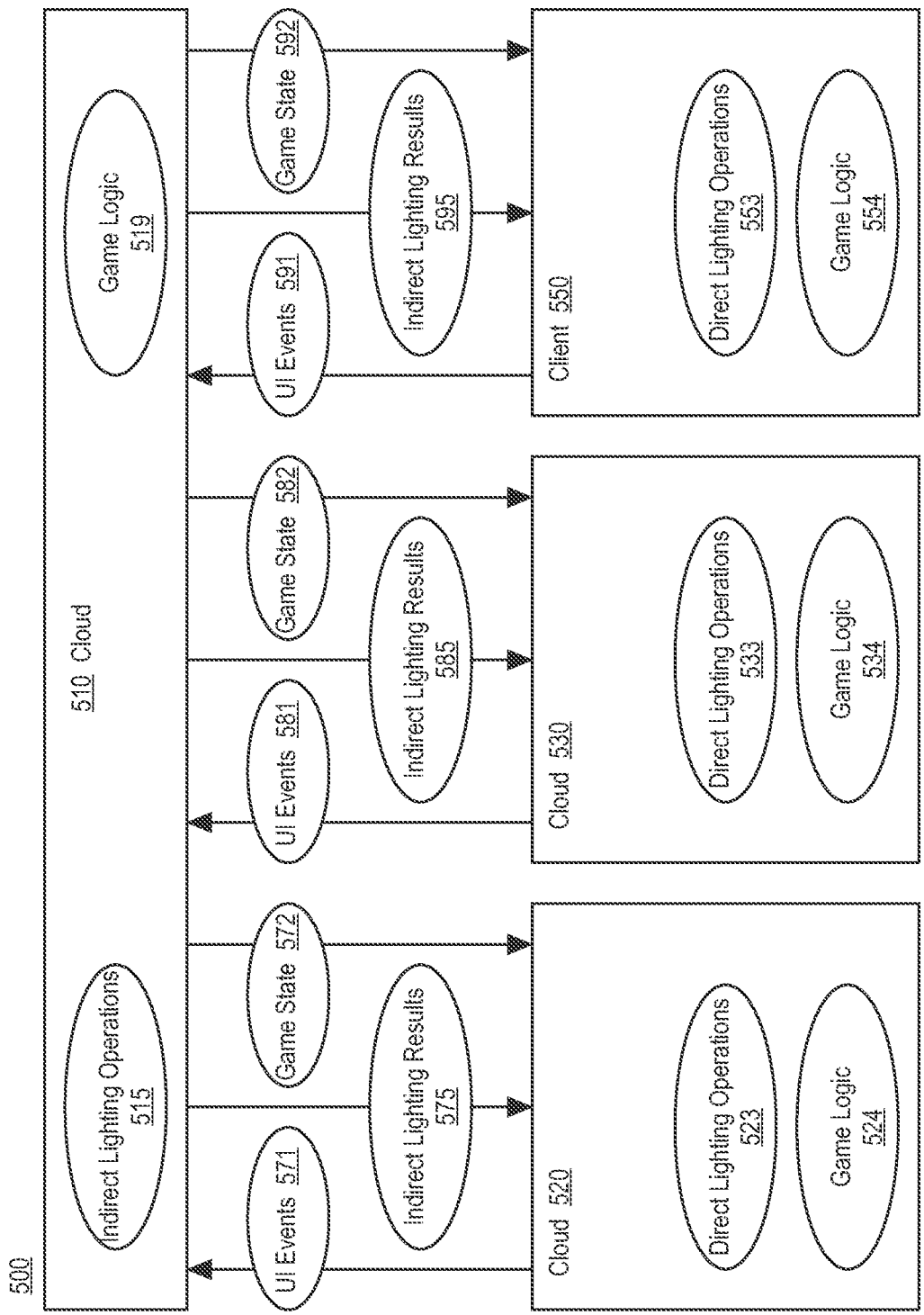
FIG. 5 is a block diagram of exemplary architecture in which direct lighting calculations are performed on a client and indirect lighting calculations are performed on a cloud in accordance with one embodiment of the present invention.

FIG. 5 is a block diagram of exemplary architecture 500 in accordance with one embodiment of the present invention. In one embodiment, architecture 500 is similar to architecture 400 in which system 410 is similar to cloud component 510 and systems 420, 430 and 450 are similar to client components 520, 530 and 550 respectively. Cloud component 510 performs indirect lighting operations 515 and game logic operations 519. Indirect lighting result information 575, 585 and 595 is forwarded to client components 520, 530 and 550 respectively. Client component 520 performs direct lighting operations 523 and game logic operations 524. Client component 530 performs direct lighting operations 533 and game logic operations 534. Client component 550 performs direct lighting operations 553 and game logic operations 554. Client components 520, 530 and 550 forward UI events 571, 581 and 591 respectively to cloud 510. Cloud 510 forwards game state 572, 582, and 592 to client components 520, 530, and 550 respectively. Systems 520, 530 and 550 combine the indirect lighting operations results with the direct lighting operation results during image rendering.

Figure 6:
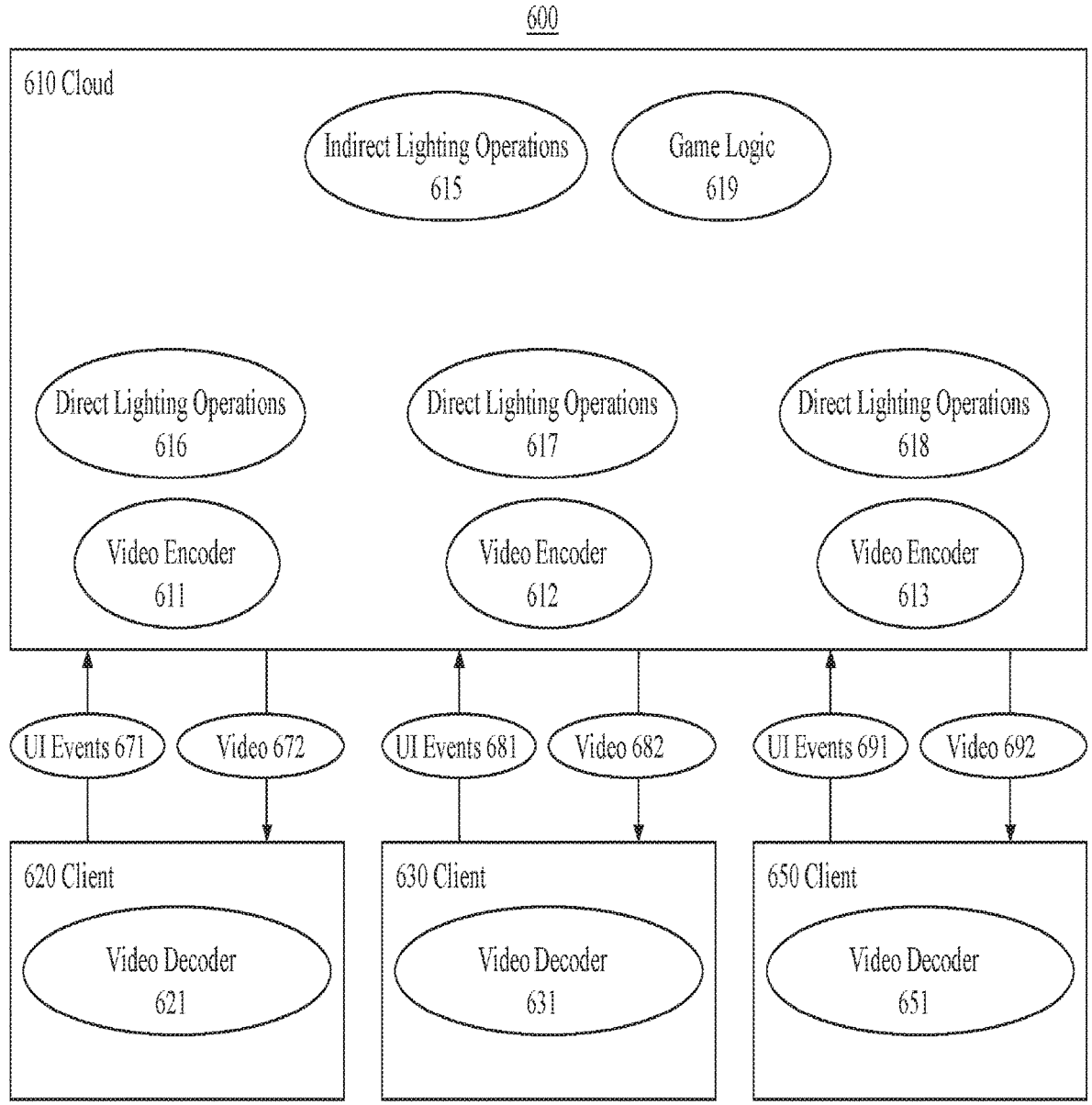
FIG. 6 is a block diagram of exemplary architecture in which direct and indirect lighting calculations are performed on the could and results are amortized in accordance with one embodiment of the present invention.

FIG. 6 is a block diagram of exemplary architecture 600 in accordance with one embodiment of the present invention. Architecture 600 includes cloud 610, client 620, client 630, and client 650. Cloud 610 performs indirect lighting operations 615, game logic 619, direct lighting operations 616, direct lighting operations 617, direct lighting operations 618, video encoding 611, video encoding 612 and video encoding 613. Direct lighting operations 616 and video encoding 611 are associated with Client 620. Direct lighting operations 617 and video encoding 612 are associated with Client 630. Direct lighting operations 618 and video encoding 613 are associated with Client 650. Clients 620, 630 and 650 perform video decoding operations 621, 631 and 651 respectively. Clients 620, 630 and 650 forward UI events 671, 681 and 691 respectively to cloud 610. Cloud 610 forwards game state 672, 682, and 692 to clients 620, 630, and 650 respectively. Cloud 610 amortizes or shares the results of indirect lighting operations 615 by combining them with direct lighting operations 616 results, direct lighting operations 617 results, and direct lighting operations 618 results during image rendering for corresponding clients 620, 630 and 650 respectively.

Figure 7:
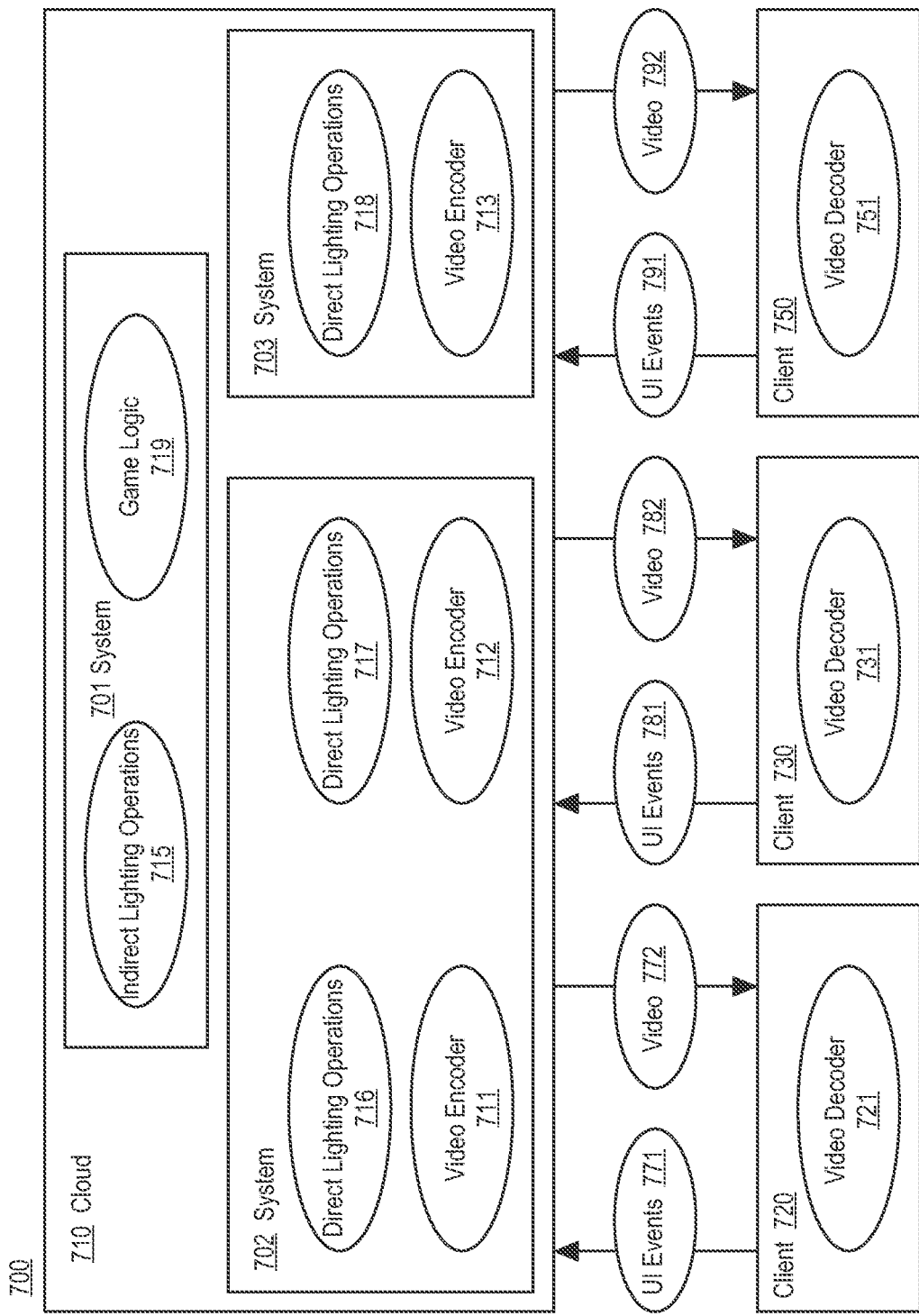
FIG. 7 is a block diagram of another exemplary architecture in which indirect lighting calculations are performed on the could and results are amortized in accordance with one embodiment of the present invention.

FIG. 7 is a block diagram of exemplary architecture 700 in accordance with one embodiment of the present invention. Architecture 700 includes cloud 710, client 720, client 730, and client 750. In one embodiment, Architecture 700 is similar to architecture 600 in which Cloud 610 is similar to Cloud 710. Cloud 710 includes Systems 701, 702 and 703. System 701 performs indirect lighting operations 715 and game logic 719. System 702 performs direct lighting 716 and video encoding 711, which are associated with client 720. System 702 also performs direct lighting 717 and video encoding 712, which are associated with client 720. System 703 performs direct lighting 718 and video encoding 713 which are associated with client 750. Clients 720, 730 and 750 perform video decoding operations 721, 731 and 751 respectively. Clients 720, 730 and 750 forward UI events 771, 781 and 791 respectively to system 710. Cloud 710 forwards game state 772, 782, and 792 to clients 720, 730, and 750 respectively. Cloud 710 amortizes or shares the results of indirect lighting operations 715 by combining them with direct lighting operations 716 results, direct lighting operations 617 results, and direct lighting operations 618 results during image rendering for corresponding clients 720, 730 and 750 respectively.

It is appreciated the present approach can be readily implemented in a variety of network configurations. In one embodiment, servers are abstracted into the cloud. The cloud can include a plurality of servers with reliability similar to a utility and similarly commoditized and abstracted, from both the end user's and developer's perspective. In one exemplary implementation, the cloud introduces a heterogeneous set of computers, connected by fast interconnect, that offload shared or overflow computations from user devices. The networks can have latency and bandwidth that vary over time and geographical region. Present approaches can enable mapping of various global illumination feature calculations (e.g., indirect lighting, etc.) into existing and future cloud architectures. They are readily implemented with different network links and partitions of work between components in accordance with latency and bandwidth characteristics of different algorithms.

In addition to being readily implemented in a variety of network configurations the present approaches is also compatible with a variety of illumination algorithms or calculation approaches. Unlike some conventional remote rendering attempts which stream video and may incidentally send graphics commands (and might be considered as placing a network between a CPU and a GPU), the present approach places links between algorithmic components.

With reference again to a voxel approach, Voxels typically represent indirect irradiance as a directionally varying, low-dimensional quantity on a sparse 3D lattice. Reconstructing indirect light from voxels is relatively inexpensive compared to other approaches (although can be more expensive than from 2D textures). However, the usually large memory footprint of the voxel grid makes transmission of voxels directly to users inconvenient or unpractical. Instead, lighting can be reconstructed in the cloud and fully-rendered frames streamed to clients or users. The voxel approach multi-resolution representation facilitates the use of lower resolutions for fast objects or camera movements and when high quality solutions are not yet available. With a world-space voxel structure, computation can be more precisely focused to compute indirect light where visible, and multiple GPUs inside a server can easily exchange data to collaborate. The implementation of the voxel approach with rendering of full frames on a server facilitates bandwidth reduction to the end user. In one embodiment, it distributes the rendering pipeline across three GPUs with two splits; one split between indirect and direct, and one split between direct and display. The voxel approach can be considered a first step from traditional full-frame streaming with dedicated resources per user to a future in which computation is amortized over multiple users on the server side.

The voxel global illumination approach can build on sparse-octree global illumination, and can be thought of as a multi-resolution octree irradiance cache or a 3D light map. Using this approach avoids constructing surface parameterizations, which can be a key advantage. In the cloud, indirect light is gathered to a directionally varying irradiance sample at the multi-resolution voxels. To reconstruct indirect light, cones are traced through this voxel grid (similar to a traditional photon map final gather) to generate view-dependent indirect light for each client. This view-dependent reconstruction also occurs in the Cloud, though it can use a separate GPU from the per-voxel sampling.

In one embodiment, the voxel approach includes various steps or operations. Scene geometry can be voxelized (either offline or dynamically). Light can be injected into a sparse voxel grid, which can also be filtered. Cones can be traced through the grid to propagate lighting. The approach can use cone traced results to generate fully-illuminated frames. Each frame can be encoded (e.g., H.264 encoding, etc.) and sent to an appropriate client. The frames can also be decoded (e.g., Decode H.264, etc.) on the client and displayed.

While basic voxel lighting may run well on high-end PCs, it is often much more difficult to implement on various other platforms. The present approach facilitates mapping it to the Cloud and making results available on the various other platforms. While view independent, the light injection and propagation steps can require substantial resources. To facilitate amortization of computations over many clients, the present approach can propagate light via cone tracing to a view independent, per-voxel representation, rather than per-pixel output. After cone tracing, querying the resulting view-independent voxel irradiance cache can occur quite efficiently. However, in some implementations, shipping a large voxel grid over a network for client reconstruction can be undesirable. Instead, the present approach can include transferring of the voxels to another Cloud GPU to reconstruct, compress, and send fully rendered frames to clients. In one embodiment, the voxel approach or algorithm uses one GPU (which can be called the global illumination GPU) to generate view-independent data plus another GPU (which can be called the final frame GPU) to generate the view-dependent frames sent to clients. The final frame GPU can be "smaller" (e.g., less resources, less capability, less performance, etc) than the global illumination GPU.

In one embodiment, to utilize fast GPU-to-GPU transfers, global illumination and final frame GPUs reside in a single server. However, a voxel representation can include a significant data size. Several strategies can be implemented to compress data for efficient transfer; including: bricking voxels, with per-brick compaction; wavelet voxel encoding for finer octree levels; restricting GPU-to-GPU transfers to a minimal octree cut; asynchronous updates with DMA transfers between GPUs; and progressive, frequency-dependent decompression. Transfers can be sped up by reducing the amount and precision of voxel data, limiting transmissions to important voxels, and using asynchronous communication. Reconstruction can be sped up (and further reduce bandwidth) by computing full resolution only in areas requiring high frequency detail.

In one embodiment, design spectra for implementation of a present voxel approach includes various behavior and characteristics. Client power consumption can be minimal. For example, minimal power consumption for support of client H.264 decode. Computations can appear synchronous to a client, but occur asynchronously on two GPUs in the Cloud. Bandwidth and latency similar to VoIP and bandwidth of video-streaming can be utilized. Multi-resolution octree enables progressive, coarse-to-fine updates. In one exemplary implementation, pipelines are updated to handle voxels.

Referring again to irradiance maps. Irradiance Maps typically represent indirect irradiance in texture light maps.

Typically these textures are static and computed offline during authoring. In one embodiment, indirect light is gathered at texels interactively in the cloud using ray tracing. Geometry can be parameterized to allow a mapping of geometry to individual irradiance map texels. Although commonly done, producing a parameterization is laborious and difficult. A client receiving irradiance maps typically decodes transmitted H.264 data and combines with locally-computed direct lighting, so relatively weak user hard-ware often suffices. As maps may be broadcast to multiple users, computation often readily amortizes. Incrementally adding multi-bounce lighting can be relatively straightforward by gathering from the prior frame's irradiance map. This strategy usually maps well to current game engines because it minimizes required network bandwidth and changes to the under-lying client-side renderer.

The present approach irradiance maps can often seamlessly fit into existing engines with directional light map illumination (e.g., such as Unreal Engine 3 and the Source Engine, etc.). Traditional systems attempt to use static, offline "pre-baked" irradiance maps. The present approach can leave the local device renderer unmodified. However, the present approach can also extend the system to stream dynamic textures for the illumination data. This can facilitate keeping the client simple. In one embodiment, a present approach can be conveniently and efficiently implemented with minimal new resources or logic for dynamic indirect light (e.g., a network decoder to interpret incoming irradiance maps).

In one embodiment, as long as the server outputs compressed irradiance maps with the required performance, it can use a variety of baking algorithms. In one exemplary implementation, the present approach can be implemented with two irradiance map servers. A first irradiance map server gathers irradiance naively at each texel using an OptiX-based ray tracer. The second irradiance map server (which can be more sophisticated and efficient that the first server) first decomposes the irradiance map into coarse basis functions. In one exemplary implementation, the second irradiance map server only gathers illumination once per basis. The present irradiance map approach can require an order of magnitude fewer rays for comparable performance, accelerating computation sufficiently to allow multiple updates of the entire irradiance map per second.

In both cases, irradiance maps can be compressed using a hardware H.264 encoder prior to transmission and decompressed on the client-side with an optimized CUDA decoder. While more sophisticated compression to mitigate artifacts can be used (as H.264 encoding was not designed for the myriad discontinuities in irradiance maps). However, the masking effects of texturing and ambient occlusion on the low-frequency indirect illumination sufficiently mitigates the visual impact of compression artifacts, and the benefits of leveraging the highly performance and power efficient H.264 encoder often outweigh the potential advantages of a custom irradiance map encoder.

In one embodiment, an irradiance map system can implement various steps or operations, including: offline generation of global unique texture parameterization; offline clustering of texels into basis functions; gathering indirect light at each basis function (or texel); reconstructing per-texel irradiance from basis functions; encoding irradiance maps to H.264; transmitting to client; decoding on the client; and rendering direct light while using irradiance map for indirect light. In one exemplary implementation, at every iteration a texture-space deferred shading pass is performed over the irradiance map (e.g., using a texture space G-buffer and current irradiance maps as input). OptiX can be used to perform a gather of indirect light, either at every valid texel or once per basis function. A raster can be used to offload computation of direct light in texture space, often improving performance. Numerous other approaches can be implemented to reduce server costs for irradiance map creation. Using cluster bases can significantly reduce the number of gather points. As a process, mutually visible texels (e.g., not separated by walls, etc.) can be clustered with similar normals. In one exemplary implementation, each basis has a radius of influence, and when gathering at basis functions, up to 8 bases are blended to reconstruct per-texel irradiance.

In one embodiment, each irradiance map update gathers a single bounce of indirect light. Multi-bounce lighting can be achieved by consulting the prior irradiance map when gathering subsequent irradiance maps. High memory coherency for rays traced in parallel can be facilitated by: reordering hemispherical QMC samples into clusters of coherent rays; tracing clustered rays in parallel (in a warp) rather than sequentially; and avoiding complex materials during irradiance map creation. To eliminate popping due to sudden illumination changes or un-expected network latency, client-side temporal filtering can be achieved using an exponentially weighted average over multiple irradiance maps In one embodiment, design spectra for implementation of a present irradiance map approach includes various behavior and characteristics. Moderate client power is needed (e.g. to render direct light plus decoded H.264 irradiance map). New irradiance maps can be computed asynchronously and incorporated on a client as they arrive. Bandwidth equivalent to streaming can be used. In one exemplary implementation, latency is tolerant with client side filtering. Progressive refinement is utilized in which path length is increased by one each iteration (e.g., by seeding with the current irradiance map, etc.). It is also possible to use hierarchical basis functions to increase resolution with each iteration. In one embodiment, client rendering pipelines use irradiance maps to increase resolution with each iteration. In one embodiment, client rendering client rendering pipelines use irradiance maps and are readily integrated with conventional client rendering pipeline schemes.

With reference now to photon tracing approaches. Photons represent indirect light as point sampled particles. As photons may have independent lifetimes, intelligent management allows reuse between frames and multiple users. This also allows parallelization over multiple cloud GPUs and the ability to progressively update photons in batches for a more immediate response to changes in lighting. Client light reconstruction can be relatively expensive, often requiring recent GPUs for interactivity. However, photons put few demands on scene authoring, typically not requiring either parameterization nor voxelization. Using photons can offer a tradeoff requiring higher user hardware computation in exchange for high image quality and reduced authoring costs. This may be considered an aggressive approach. However, it can have the potential for a high quality, especially for glossy indirect reflections.

It is appreciated that full frames can be rendered on the server using irradiance maps or photons instead of voxels. In one embodiment a separate server process launches and renders full frames when a mobile client connects to the server. However, for sufficiently powerful clients, those methods can present a lower bandwidth, lower-latency solution if the client participates in rendering. In one embodiment, the thrust of the voxel strategy is on distributing the indirect and direct light computation between two server-side GPUs that do not share an address space but do share a high-performance bus. In one exemplary implementation, streaming of the final frames to the client can be configured similar to existing solutions and independent of the indirect light strategy.

In one embodiment, a standard photon tracer is implemented via a Cloud-based OptiX engine. The photons are compacted and compressed for transmission to the clients, which then render indirect illumination from them via a screen-space scatter approach, rather than a traditional final gather. To produce timely updates, photons are continually traced in small batches and transmitted based on completion rather than waiting for all photons in the scene. This allows convergence in time, similar to frameless rendering or real-time path tracing approaches. Because indirect light often changes gradually, in many cases the artifacts resulting from this are hard to perceive while the short update time between a scene change and a new illumination being sent to the client is usually beneficial.

In one embodiment, a photon map system can implement various steps or operations, including: tracing photons using Cloud-based ray tracer; transferring a bit-packed encoding of photons to clients; expiring old photon packets on a client; replacing with new ones; scattering photons into client view to accumulate indirect light; and summing indirect light with locally-computed direct illumination.

In one embodiment, a key feature of the present approach pipeline is photon hatching. A global parameter controls photon count per emitted watt of illumination, which sets total photons per iteration. These are grouped into fixed-sized batches, with photons in each batch emitted from one light. To ensure full GPU utilization and avoid noise for dim lights, additional photons are added (and renormalized) so each light emits an integer number of batches. Each photon stores direction, power, position, radius, and normalization factors packed into a 20-byte structure. Normalization can be deferred to the client to preserve precision. This precision can be ignored to regain some network bandwidth.

Batching can have many advantages. Common ray origins and directions can dramatically improve memory coherence (and performance) when traversing ray acceleration structures. Tracing and transmitting small batches also usually reduces latency between interaction and first visible change. Fixed batch sizes can simplify memory allocations and transfers at multiple stages in the pipeline. In one embodiment, when lighting changes, identifying stale photons is straightforward, as batches directly correspond to specific lights; and only photons whose corresponding light changed are reshot. In one exemplary implementation, for dynamic geometry, only photon batches that interact with this geometry need updating.

Once photons reach the client an image space splatting approach is used to gather indirect light. A 2D bounds method can be used. This uses a deferred render pass, which expands photons to a polygonal approximation of their area of influence. A photon density estimation kernel runs over covered pixels, with results output to a low resolution additive accumulation buffer. A bilateral upsample can be supplied to get a full-resolution indirect illumination buffer. This approach can be a relatively fastest approach and can be easily incorporated into a renderer.

In one embodiment, design spectra for implementation of a present photon approach includes various behavior and characteristics. Relatively powerful clients are utilized for photon reconstruction requires powerful client. Photons can be computed asynchronously and incrementally incorporated on the client-side. In one exemplary implementation high bandwidth is utilized due to photon size and progressive nature provides good latency tolerance. Subset of photons can be updated, including just those for dynamic lights or objects. Memory use is reasonable and reconstruction is readily implemented.

Figure 12:
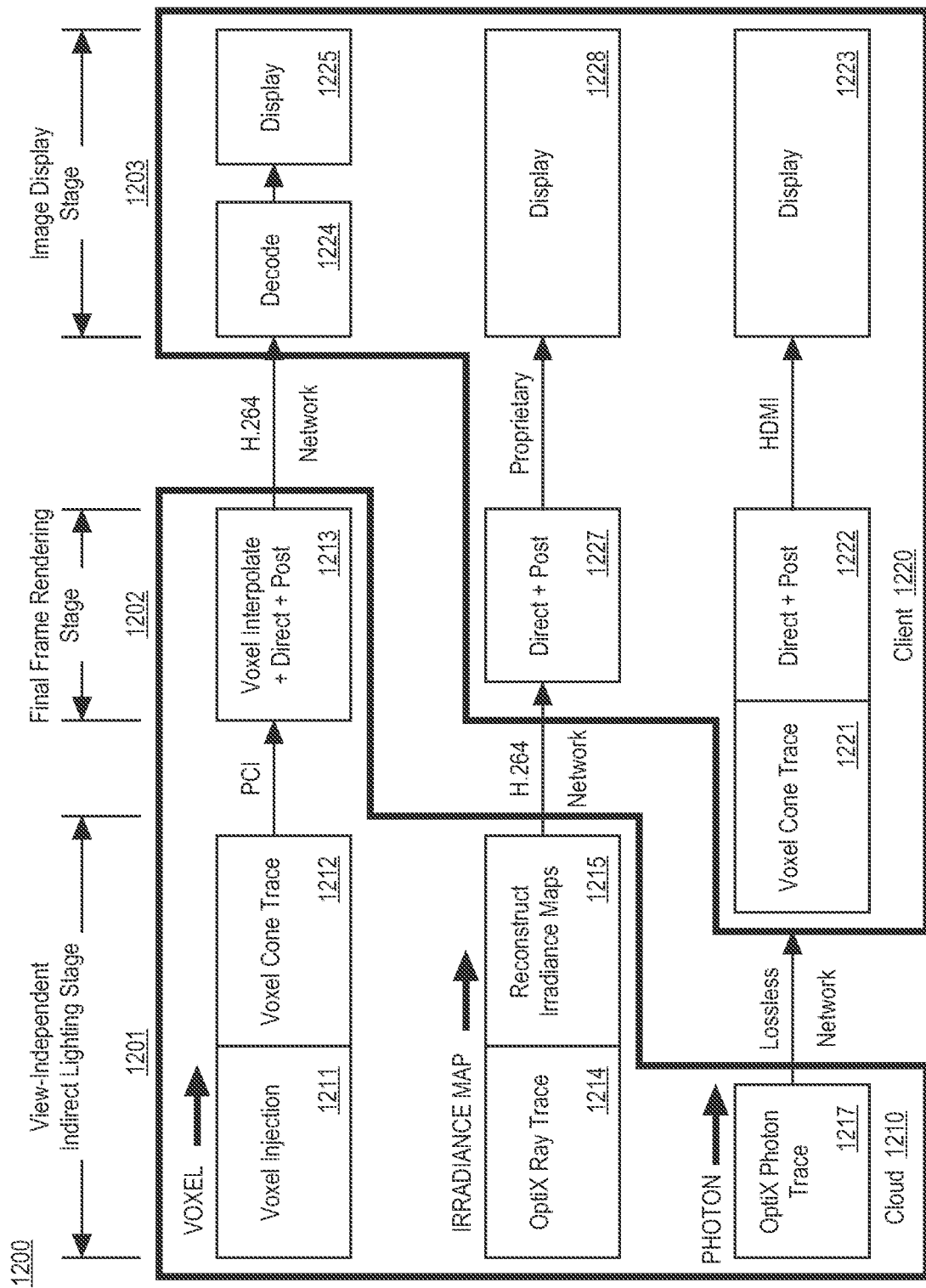
FIG. 12 is a block diagram of exemplary network 1200 performance of various lighting calculation operations in accordance with one embodiment of the present invention.

FIG. 12 is a block diagram of exemplary network 1200 in accordance with one embodiment of the present invention. Network 1200 includes cloud 1210 and client 1220 and facilitates utilization of a variety of global illumination algorithms, including a voxel approach, an irradiance map approach and a photon approach. The voxel approach includes voxel injection operations 1211, voxel cone trace operations 1212, voxel interpolation with direct and post operations 1213, decode operations 1224 and display operation 1225. The irradiance map approach includes OptiX ray trace operations 1214, reconstruct irradiance map operations 1215, direct and post operations 1227 and display operations 1228. The photon approach includes OptiX photon operations 1217, voxel cone trace operations 1221, direct and post operations 1222 and display operations 1223. Cloud 1210 performs voxel injection operations 1211, voxel cone trace operations 1212, voxel interpolation with direct and post operations 1213, OptiX ray trace operations 1214, reconstruct irradiance map operations 1215, and OptiX photon operations 1217. Client 1220 performs decode operations 1224, display operation 1225, direct and post operations 1227, display operations 1228, voxel cone trace operations 1221, direct and post operations 1222, and display operations 1223. While there can be different bandwidth and latency between the different operations, in one embodiment the network can be configured so that network connections are located at points with minimal bandwidth requirements. For example, network 1200 can be configured so that network connections are located between voxel interpolation with direct and post operations 1213 and decode operations 1224; between reconstruct irradiance map operations 1215 and direct and post operations 1227; and between OptiX photon trace operations 1217 and voxel cone trace operations 1221. In one embodiment, display 1225 is associated with a smart phone end use system, display 1228 is associated with a laptop computer end use system and display 1223 is associated with a high end personal computer (PC) end use system and a different global illumination algorithm (e.g., voxel, irradiance map, or photon) is utilized in accordance with the type of end use system.

FIG. 8 is a flow chart of an exemplary method 800 in accordance with one embodiment of the present invention. In one embodiment, resources at a local location are configured to perform operations associated with blocks 810 and 840 and resources at a remote location are configured to perform operations associated with blocks 820 and 830.

In block 810, a first portion of lighting calculations for an image are performed at a local location. In one embodiment, the first portion of lighting calculations is associated with direct lighting calculations. The local location can include a client.

In block 820, a second portion of lighting calculations for an image are performed at a remote location. In on embodiment, the second portion of lighting calculations is associated with indirect lighting calculation. The remote location can include a server. In one exemplary implementation, the remote location is included in a cloud computing environment.

In block 830, results of the first portion of the lighting calculations are communicated to the local location. The results of the second portion of lighting calculations can be communicated to a plurality of other locations.

In block 840 results of the first portion of the lighting calculations are combined with results of the second portion of the lighting calculations at the local location. The results of the second portion of lighting calculations can be amortized among a plurality of other locations.

In one embodiment, a present approach for computing indirect lighting in the cloud supports real-time rendering for interactive 3D applications on a user's local device. A traditional graphics pipeline (e.g., associated with a single device, etc.) can be mapped onto a distributed system or architecture. In one exemplary implementation, there are various differences from conventional single device approaches. Mapping the indirect light calculations onto the cloud introduces potential asymmetry between computational resources available at the cloud and local device side or the pipelines. In a multi user environment, a cloud solution can amortize "expensive" global illumination operations across multiple users. There can also be differences in latency and bandwidth between some pipeline stages. For example, differences between single device hardware memory bus characteristics and network connections can contribute to differences in latency and bandwidth. It is appreciated that present approaches facilitate flexible implementation of tradeoffs in different partitions of the global illumination workload between cloud and local devices, with consideration or how available network and computational power/performance influence design decisions and image quality. Consideration can also be given to the characteristics and functionality of the end user devices, including: lower power/performance devices (e.g., that can stream video, etc.); medium power/performance devices that can also perform basic rendering (e.g., z-buffer, direct light, texture mapping, etc.); and higher power/performance devices that can also perform at least moderately sophisticated work beyond basic graphics.

It is also appreciated, that there are significant differences between conventional remote rendering attempts and present approaches. As described above, present approaches facilitate various implementations that accommodate different considerations. The considerations can include consideration of implementation details due to differences between types of data sets being processed (e.g., differences in data sets associated with real time interactive video games versus scientific visualization applications, etc.) and the impact of latency and bandwidth (e.g., focus on accuracy rather than latency, etc.). Conventional attempts at parallel rendering typically try to emphasize utilization and not latency or amortization over users, giving rise to significantly different design space and bottlenecks that do not extend well to real time or interactive cloud rendering. Present approaches are not necessarily limited to specialized contexts (e.g., multi-node ray tracers, VR CAVEs, etc), but rather facilitate convenient and efficient implementation to a wide variety of applications (e.g., industry-and-systems oriented approach, deployment on a various scales such as consumer scale, etc.).

In one embodiment, coarse synchronization between direct and indirect light is utilized and latency from a distributed cloud architecture is acceptable. Present approaches facilitate direct lighting rendering on a local device enabling more immediate response to user input, irrespective of network conditions. In one exemplary implementation, the indirect illumination is view-independent and more robust to temporary network outages. The last known illumination can be reused (e.g., until network connectivity is restored, etc.).

Figure 9:
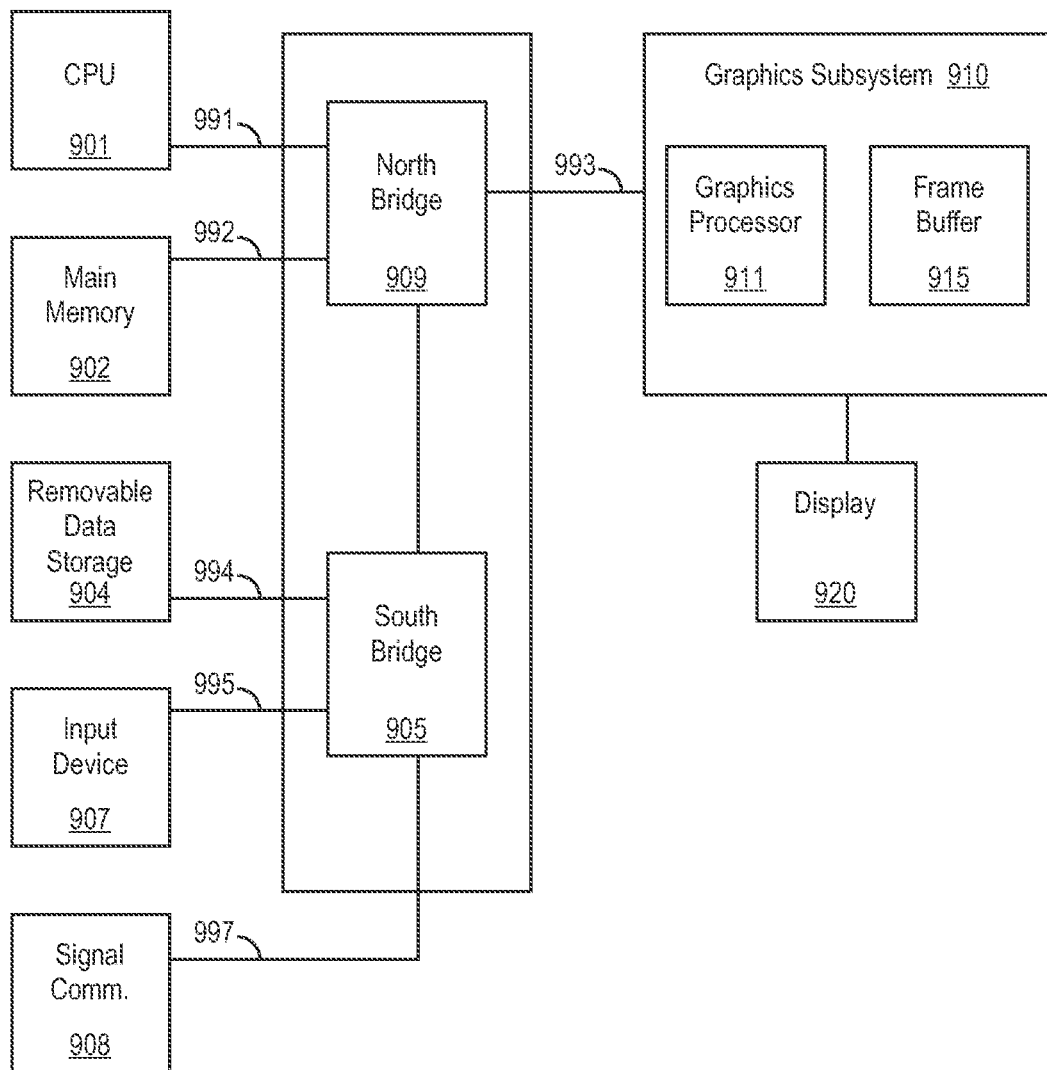
FIG. 9 is a block diagram of an exemplary computer system upon which embodiments of the present invention can be implemented.

With reference to FIG. 9, a block diagram of an exemplary computer system 900 is shown, one embodiment of a computer system upon which embodiments of the present invention can be implemented. Computer system 900 includes central processor unit 901, main memory 902 (e.g., random access memory), chip set 903 with north bridge 909 and south bridge 905, removable data storage device 904, input device 907, signal communications port 908, and graphics subsystem 910 which is coupled to display 920. Computer system 900 includes several busses for communicatively coupling the components of computer system 900. Communication bus 991 (e.g., a front side bus) couples north bridge 909 of chipset 903 to central processor unit 901. Communication bus 992 (e.g., a main memory bus) couples north bridge 909 of chipset 903 to main memory 902. Communication bus 993 (e.g., the Advanced Graphics Port interface) couples north bridge of chipset 903 to graphic subsystem 910. Communication buses 994, 995 and 997 (e.g., a PCI bus) couple south bridge 905 of chip set 903 to removable data storage device 904, input device 907, signal communications port 908 respectively. Graphics subsystem 910 includes graphics processor 911 and frame buffer 915.

The components of computer system 900 cooperatively operate to provide versatile functionality and performance. In one exemplary implementation, the components of computer system 900 cooperatively operate to provide predetermined types of functionality. Communications bus 991, 992, 993, 994, 995 and 997 communicate information. Central processor 901 processes information. Main memory 902 stores information and instructions for the central processor 901. Removable data storage device 904 also stores information and instructions (e.g., functioning as a large information reservoir). Input device 907 provides a mechanism for inputting information and/or for pointing to or highlighting information on display 920. Signal communication port 908 provides a communication interface to exterior devices (e.g., an interface with a network). Display device 920 displays information in accordance with data stored in frame buffer 915. Graphics processor 911 processes graphics commands from central processor 901 and provides the resulting data to video buffers 915 for storage and retrieval by display monitor 920.

Figure 10:
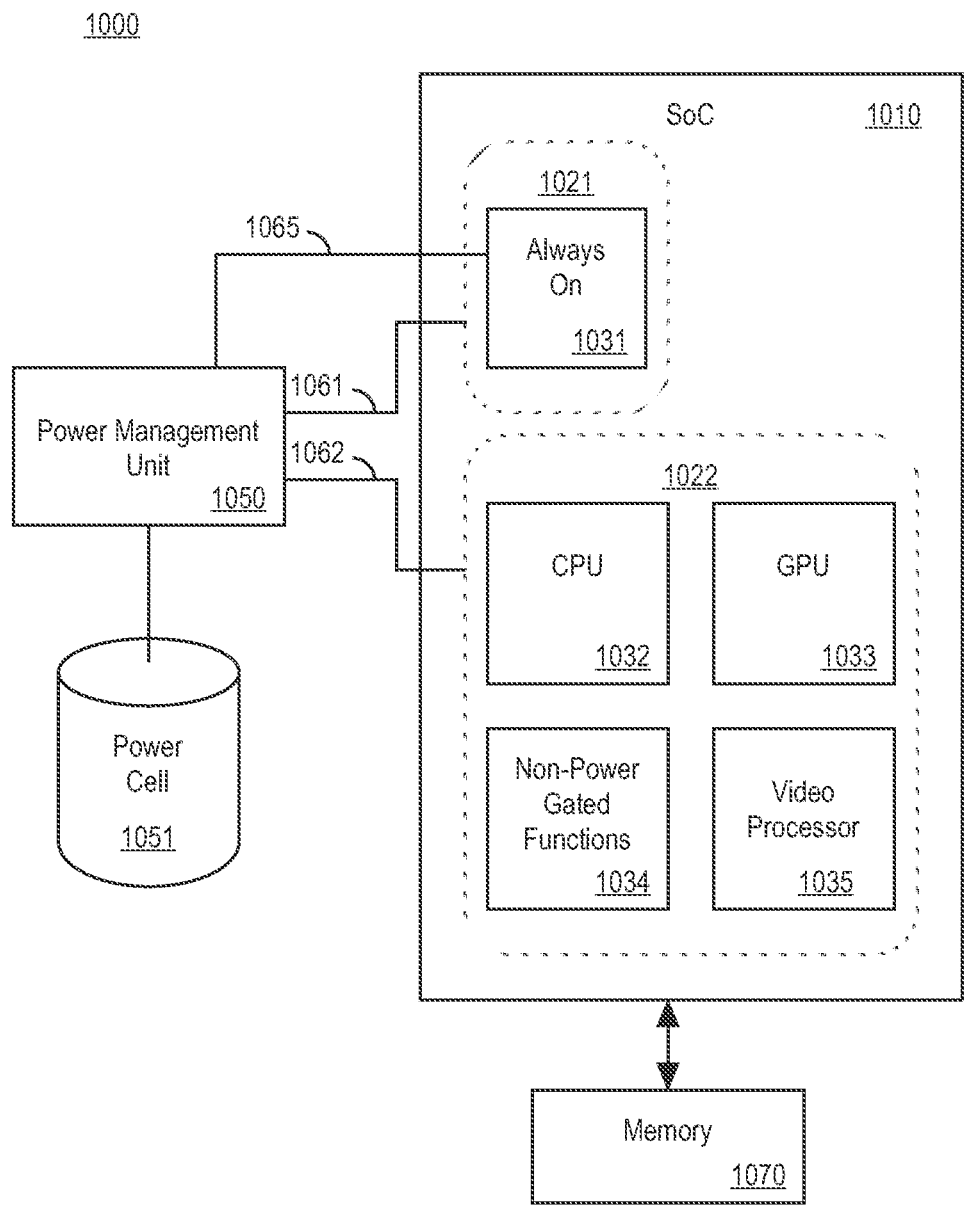
FIG. 10 shows another exemplary architecture that incorporates an exemplary video processor or graphics processor in accordance with one embodiment of the present invention.

FIG. 10 shows another exemplary architecture that incorporates an exemplary video processor or graphics processor in accordance with one embodiment of the present invention. As depicted in FIG. 10, system 1000 embodies a programmable SOC integrated circuit device 1010 which includes a two power domains 1021 and 1022. The power domain 1021 includes an "always on" power island 1031. The power domain 1022 is referred to as the core of the SOC and includes a CPU power island 1032, a GPU power island 1033, a non-power gated functions island 1034, and an instance of the video processor. The FIG. 10 embodiment of the system architecture 1000 is targeted towards the particular intended device functions of a battery-powered handheld SOC integrated circuit device. The SOC 1010 is coupled to a power management unit 1050, which is in turn coupled to a power cell 1051 (e.g., one or more batteries). The power management unit 1050 is coupled to provide power to the power domain 1021 and 1022 via the dedicated power rail 1061 and 1062, respectively. The power management unit 1050 functions as a power supply for the SOC 1010. The power management unit 1050 incorporates power conditioning circuits, voltage pumping circuits, current source circuits, and the like to transfer energy from the power cell 1051 into the required voltages for the rails 1061-1062.

In the FIG. 10 embodiment, the video processor is within the domain 1022. The video processor provides specialized video processing hardware for the encoding of images and video. As described above, the hardware components of the video processor are specifically optimized for performing real-time video encoding. The always on power island 1031 of the domain 1021 includes functionality for waking up the SOC 1010 from a sleep mode. The components of the always on domain 1021 will remain active, waiting for a wake-up signal. The CPU power island 032 is within the domain 1022. The CPU power island 1032 provides the computational hardware resources to execute the more complex software-based functionality for the SOC 1010. The GPU power island 1033 is also within the domain 1022. The GPU power island 1033 provides the graphics processor hardware functionality for executing 3-D rendering functions.

Figure 11:
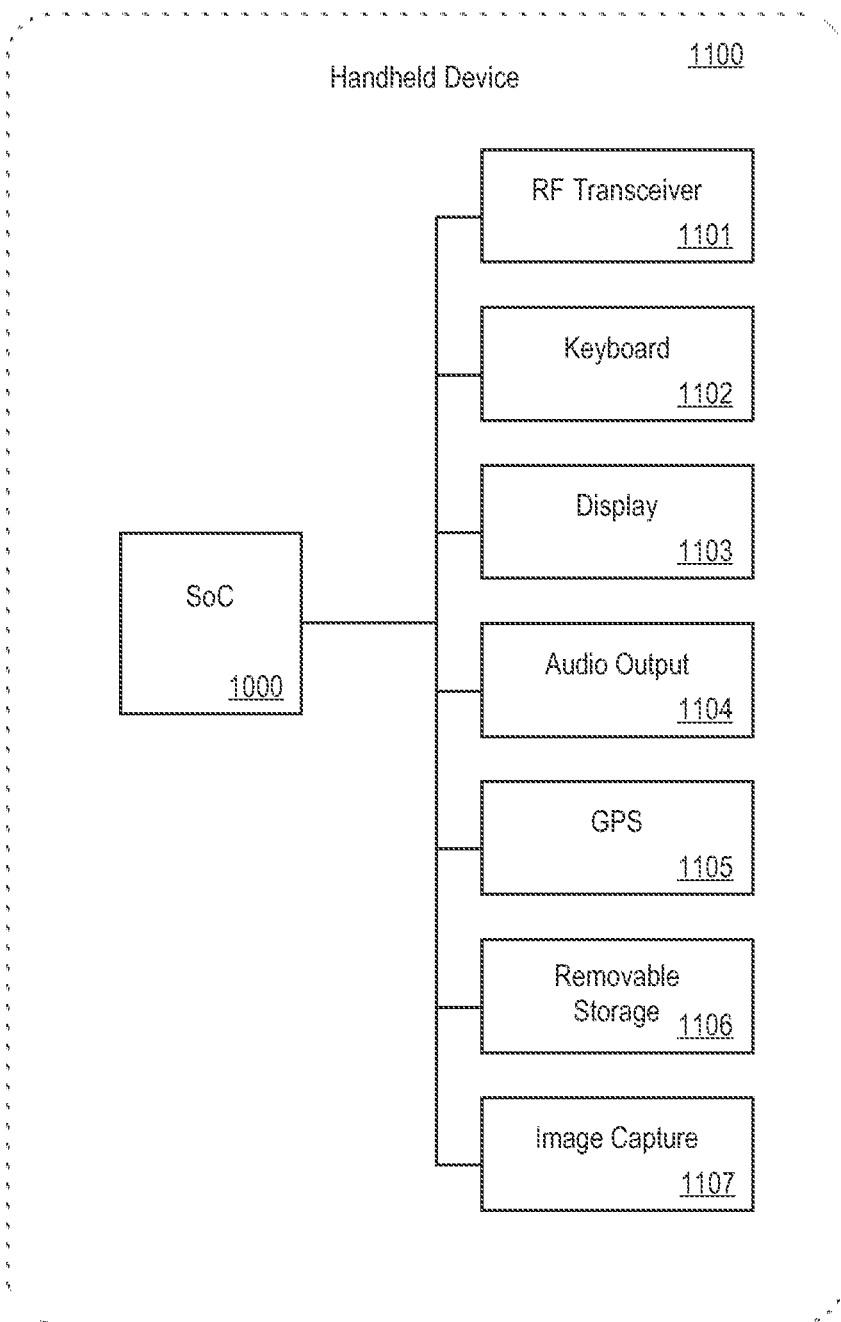
FIG. 11 shows a diagram showing the components of a handheld device 1100 in accordance with one embodiment of the present invention.

FIG. 11 shows a diagram showing the components of a handheld device 1100 in accordance with one embodiment of the present invention. As depicted in FIG. 11, a handheld device 1100 includes the system architecture 1000 described above in the discussion FIG. 10. The handheld device 1100 shows peripheral devices 1101-1107 that add capabilities and functionality to the device 1100. Although the device 1100 is shown with the peripheral devices 1101¬1107, it should be noted that there may be implementations of the device 1100 that do not require all the peripheral devices 1101-1107. For example, in an embodiment where the display(s) 1103 are touch screen displays, the keyboard 1102 can be omitted. Similarly, for example, the RF transceiver can be omitted for those embodiments that do not require cell phone or WiFi capability. Furthermore, additional peripheral devices can be added to device 1100 beyond the peripheral devices 1101-1107 shown to incorporate additional functions. For example, a hard drive or solid state mass storage device can be added for data storage, or the like.

The RF transceiver 1101 enables two-way cell phone communication and RF wireless modem communication functions. The keyboard 1102 is for accepting user input via button pushes, pointer manipulations, scroll wheels, jog dials, touch pads, and the like. The one or more displays 1103 are for providing visual output to the user via images, graphical user interfaces, full-motion video, text, or the like. The audio output component 904 is for providing audio output to the user (e.g., audible instructions, cell phone conversation, MP3 song playback, etc.). The GPS component 1105 provides GPS positioning services via received GPS signals. The GPS positioning services enable the operation of navigation applications and location applications, for example. The removable storage peripheral component 1106 enables the attachment and detachment of removable storage devices such as flash memory, SD cards, smart cards, and the like. The image capture component 1107 enables the capture of still images or full motion video. The handheld device 1100 can be used to implement a smart phone having cellular communications technology, a personal digital assistant, a mobile video playback device, a mobile audio playback device, a navigation device, or a combined functionality device including characteristics and functionality of all of the above.

Thus, the present systems and methods facilitate enhanced image presentation in an efficient and effective manner. Direct and indirect lighting calculations can be performed by different systems which in turn facilitates increased image presentation results on a variety of systems (e.g., clients, end user devices, mobile devices, etc.). In addition, various global and indirect lighting calculation results can be amortized over a variety of different systems or clients. A variety of indirect lighting representations and compression techniques can be utilized including separating view-independent and view-dependent computations between GPUs and repurposing video codec (e.g., such as H.264 for irradiance map compression, etc.).

Some portions of the detailed descriptions are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

The invention claimed is:
1. A computer-implemented method comprising:
identifying at a cloud network including a server computer, one or more scenes to be rendered at a client device;
performing, at the server computer of the cloud network, a first portion of one or more computations of indirect lighting of the one or more scenes using photons representing indirect light as point sampled particles; and sending data representative of one or more of the photons and associated with the first portion of one or more computations from the cloud network to the client device and causing the client device to perform a second portion of one or more computations of the indirect lighting using the one or more of the photons from the data and to render a frame comprising the indirect lighting of the one or more scenes.

2. The method of claim 1, wherein the sending data comprises streaming batches of the photons to the client device.

3. The method of claim 1, wherein the second portion of one or more computations is of one or more glossy indirect reflections in the one or more scenes.

4. The method of claim 1, wherein the data includes a direction of a photon and the second portion of one or more computations is based at least on the direction of the photon.

5. The method of claim 1, wherein the data comprises a compressed version of the one or more of the photons.

6. The method of claim 1, wherein the first portion of one or more computations of the indirect lighting and the sending of the data are performed asynchronously with reconstruction of the indirect lighting on the client device.

7. The method of claim 1, wherein the performing the first portion of one or more computations comprises tracing the photons in batches that correspond to the one or more scenes, wherein the sending of the data includes transmitting a batch of the batches based on completion of the tracing for the batch and prior to completion of the tracing for all of the batches of the one or more scenes.

8. A computer-implemented method comprising:
receiving, from a cloud network, first data representative of photons and associated with a first portion of one or more computations of indirect lighting of one or more scenes performed using the photons representing indirect light as point sampled particles;

generating second data representative of the indirect lighting based at least on performing a second portion of one or more computations of the indirect lighting using the photons from the first data; and combining the second data with data representative of direct lighting of the one or more scenes as part of rendering one or more frames of the one or more scenes.

9. The method of claim 8, wherein the generating the second data representative of the indirect lighting comprises a screen-space scatter of at least one of the photons.

10. The method of claim 8, wherein the reconstructing the indirect lighting is performed incrementally and asynchronously with the receiving of the first data.

11. The method of claim 8, wherein the first portion of one or more computations of indirect lighting is of at least a first frame of the one or more scenes and the first data comprises at least one photon result reused from the at least the first frame in the one or more frames of the one or more scenes.

12. The method of claim 8, wherein the generating the second data representative of the indirect lighting comprises decompressing the photons from the first data.

13. The method of claim 8, wherein the generating the second data representative of the indirect lighting comprises:
expanding at least some of the photons to an approximation of an area of influence of the at least some of the photons;
running a photon density estimation kernel over pixels covered by the approximation; and
producing the second data representative of the indirect lighting based at least in part on upsampling results of the running of the photo density estimation kernel.

14. The method of claim 8, further comprising generating the data representative of direct lighting based at least in part on performing at least one computation of the direct lighting of the one or more scenes.

15. A computer-implemented method comprising:
determining a plurality of photons, the plurality of photons representing indirect light as point sampled particles of one or more scenes;
determining photon batches based at least on grouping the plurality of photons into the photon batches;
generating, using a first device, data representative of a batch of the photon batches and associated with a first portion of one or more computations of indirect lighting of the one or more scenes based at least on tracing the batch of the photon batches in the one or more scenes; and
sending the data to a second device resulting in the second device performing a second portion of one or more computations of the indirect lighting using one or more photons from the batch and resulting in rendering the indirect lighting of the one or more scenes.

16. The method of claim 15, wherein the grouping of the plurality of photons into the photon batches is based at least on each photon within a same batch of the photon batches being emitted from a same light.

17. The method of claim 15, wherein the determining the plurality of photons is based at least on a parameter that controls photon count per emitted watt of illumination.

18. The method of claim 15, wherein the determining the photon batches comprises adding at least one photon to one or more of the photon batches so that each light emits an integer number of the photon batches.

19. The method of claim 15, wherein the sending of the data includes transmitting results of the tracing of the batch based on completion of the tracing for the batch and prior to completion of tracing for all of the photon batches.

20. The method of claim 15, wherein the data includes direction, power, position, radius, and normalization factors for each photon of the batch.

* * * * *